United States Patent
Paulson et al.

(10) Patent No.: US 9,382,968 B2
(45) Date of Patent: Jul. 5, 2016

(54) ENGINE SYSTEM HAVING TORSIONAL COUPLING WITH THIN WEB FLYWHEEL

(71) Applicant: Electro-Motive Diesel, Inc., LaGrange, IL (US)

(72) Inventors: Timothy J. Paulson, Schererville, IN (US); Xinmin Xu, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 35 days.

(21) Appl. No.: 14/154,746

(22) Filed: Jan. 14, 2014

(65) Prior Publication Data

US 2015/0198220 A1    Jul. 16, 2015

(51) Int. Cl.
*F16D 3/79* (2006.01)
*F16F 15/30* (2006.01)
*F16D 3/12* (2006.01)

(52) U.S. Cl.
CPC . *F16F 15/30* (2013.01); *F16D 3/12* (2013.01); *F16D 3/79* (2013.01); *F16F 2230/34* (2013.01)

(58) Field of Classification Search
CPC ............... F16F 15/30; F16D 3/12; F16D 3/79
USPC .................... 464/98, 99; 74/572.2; 123/192.1
See application file for complete search history.

(56) References Cited

U.S. PATENT DOCUMENTS

| 4,133,187 | A | * | 1/1979 | Wildhaber | F16D 3/77 |
| | | | | | 464/99 X |
| 5,899,813 | A | * | 5/1999 | Bunce | F16D 3/72 |
| | | | | | 464/99 X |
| 6,764,405 | B2 | | 7/2004 | Kundermann | |
| 6,967,419 | B2 | | 11/2005 | Atarashi | |
| 7,775,890 | B2 | | 8/2010 | Shaffer | |
| 2007/0137421 | A1 | | 6/2007 | Reid | |
| 2013/0072311 | A1 | | 3/2013 | Smith et al. | |

FOREIGN PATENT DOCUMENTS

FR    446.977    * 12/1912 ...................... 464/99

* cited by examiner

*Primary Examiner* — Gregory Binda
(74) *Attorney, Agent, or Firm* — Baker & Hostetler LLP

(57) ABSTRACT

An engine system includes an internal combustion engine, a driven unit, and a torsional coupling between a crankshaft of the engine and a driveshaft of the driven unit. The torsional coupling includes a driven-side disc coupled to the driveshaft, and a flywheel having an engine-side disc coupled to the crankshaft. The engine-side disc has an axial thickness in a discontinuous thickness range from about 0.2 inches to about 0.3 inches, so as to flex the engine-side disc predominantly over the driven-side disc in response to the driveline deflecting loads.

9 Claims, 4 Drawing Sheets

ENGINE SYSTEM HAVING TORSIONAL COUPLING WITH THIN WEB FLYWHEEL

TECHNICAL FIELD

The present disclosure relates generally to a torsional coupling in an engine system, and more particularly to a flywheel disc in a torsional coupling having a thin web resistant to fatigue failure.

BACKGROUND

Internal combustion engine systems tend to be quite dynamic. A rotating crankshaft of an engine used to provide torque to a load accelerates and decelerates with the firing of the individual cylinders, for example. The load driven by the engine can also have varying resistance to being rotated or otherwise generate torsional or other forces additive or subtractive to forces provided by the engine. External factors such as vibrations from a vehicle employing the engine system can add further complexity to the dynamic environment.

Loads commonly driven in engine systems may be electrical generators, pumps, propulsion drives, compressors or any of a variety of other devices. In many systems a mechanism commonly referred to as a torsional coupling is positioned operably between an engine and a driven load to transfer torque from the engine. Due to relatively harsh operating conditions such torsional couplings may be relatively robust in design. Despite best efforts, complex vibrations and deflections within the driveline comprised of the engine crankshaft, torsional coupling and parts of a driven unit can eventually cause failure or performance degradation in various of the system components. Commonly owned U.S. Pat. No. 7,775,890 to Shaffer is directed to a flexible drive train having an axial and radial motion limiter. The limiter in Shaffer appears to be configured to limit a maximum axial movement and a maximum radial movement between a flywheel and a driven member, presumably to mitigate wear or fatigue.

SUMMARY

In one aspect, an engine system includes an internal combustion engine having an engine housing and a crankshaft rotatable within the engine housing, and a driven unit including a driven unit housing and a driveshaft rotatable within the driven unit housing. The engine system further includes a torsional coupling rotatable about an axis of rotation to transfer torque between the internal combustion engine and the driven unit. The torsional coupling includes a driven-side disc coupled to the driveshaft, and a flywheel having an engine-side disc coupled to the crankshaft, and an axially projecting annular flange coupling the engine-side disc to the driven-side disc. The driven-side disc has a greater axial thickness, and the engine-side disc has an engine-side disc web with a lesser axial thickness in a range from about 0.2 inches to about 0.3 inches and discontinuous in a middle of the range.

In another aspect, a torsional coupling for an engine system having an internal combustion engine and a driven unit includes a driven-side disc configured to couple to a driveshaft in the driven unit, and a flywheel including an engine-side disc configured to couple to a crankshaft in the internal combustion engine, and an axially projecting annular flange. The annular flange defines a center axis common to the driven-side and engine-side discs, and couples the engine-side disc to the driven-side disc to transfer torque between the crankshaft and the driveshaft. The engine-side disc has an inboard region, an outboard region attached to the axially projecting annular flange, and an engine-side disc web extending radially between the inboard and outboard regions and circumferentially about the center axis. The driven-side disc has a greater axial thickness, and the engine-side disc web has a lesser axial thickness such that the engine-side disc flexes predominantly over the driven-side disc, in response to loads deflecting the torsional coupling during the transfer of torque. The lesser axial thickness is in a range from about 0.2 inches to about 0.3 inches and discontinuous in a middle of the range.

In still another aspect, a flywheel, for a torsional coupling in an engine system having an internal combustion engine and a driven unit, includes an engine-side disc configured to couple to a crankshaft in the internal combustion engine and defining a center axis, and an axially projecting annular flange attached to the engine-side disc and configured to couple the engine-side disc to a driven-side disc coupled to a driveshaft in the driven unit to transfer torque between the crankshaft and the driveshaft. The engine-side disc includes an inboard region having an inner disc perimeter, an outboard region having an outer disc perimeter and being attached to the axially projecting annular flange, and a disc web extending radially between the inboard and outboard regions and circumferentially about the center axis. The engine-side disc has an axial thickness varying between the inner perimeter and the outer perimeter, such that within the disc web the axial thickness is in a range from 0.2 inches to 0.3 inches and discontinuous in a middle of the range, and the disc web flexes in response to loads deflecting the engine-side disc during the transfer of torque.

DETAILED DESCRIPTION

Figure 1:
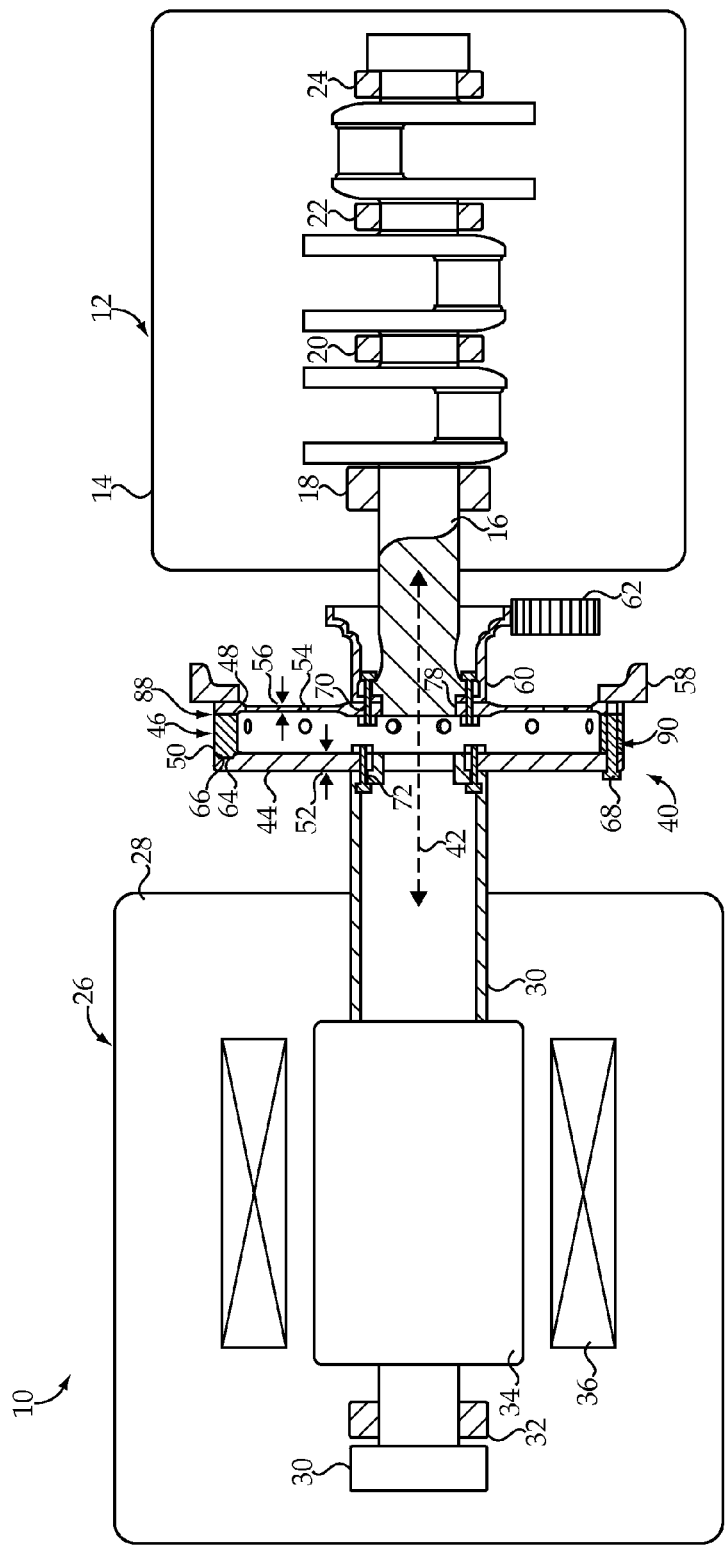
FIG. 1 is a partially sectioned side diagrammatic view of an engine system, according to one embodiment.

Referring to FIG. 1, there is shown an engine system 10 according to one embodiment. Engine system 10 may include an internal combustion engine 12 having an engine housing 14 and a crankshaft 16 rotatable within engine housing 14. Engine system 10 may further include a driven unit 26 including a driven unit housing 28 and a driveshaft 30 rotatable within the driven unit housing. Crankshaft 16 is supported for rotation within engine housing 14 via a plurality of bearings 18, 20, 22 and 24. Driveshaft 30 may be supported for rotation within driven unit housing 28 via a total of one bearing 32, the significance of which will be further apparent from the following description. In other embodiments, driveshaft 30 might be supported by a plurality of bearings. In one practical implementation strategy, engine 12 includes a compression ignition diesel engine, having a plurality of cylinders with a plurality of pistons configured for operation in a conventional manner. Also in a practical implementation strategy, driven unit 26 may include an electrical generator. A rotor 34 mounted to driveshaft 30 to form an assembly rotatable within driven unit housing 28 may include a permanent magnet rotor of the electrical generator. A stator 36 may be mounted in housing 28. In alternative embodiments engine system 10 might include a different type of driven unit such as a pump, compressor, marine or land propulsion drive, or still another type of engine-driven load. A torsional coupling 40 is rotatable about an axis of rotation 42 to transfer torque between engine 12 and driven unit 26. Crankshaft 16, driveshaft 30, and torsional coupling 40 may all be coaxial. As will be further apparent from the following description, torsional coupling 40 is uniquely configured for resistance to fatigue failure of its components, and to limit performance degradation on parts of engine system 10 coupled with torsional coupling 40.

Torsional coupling 40 includes a driven-side disc 44 coupled to driveshaft 30, for instance via a plurality of bolts 72. Torsional coupling 40 also includes a flywheel 46 having an engine-side disc 48 coupled to crankshaft 16, via another plurality of bolts 70, and an axially projection annular flange 50 coupling engine-side disc 48 to driven-side disc 44. Disc 48 and flange 50 may be coaxial, and either can be understood to define axis of rotation or center axis 42. Driven-side disc 44 has a greater axial thickness 52, which may include a uniform thickness throughout. Engine-side disc 48 includes a disc web 54 having a lesser axial thickness 56. Axial thickness 56 may be in a range from about 0.2 inches to about 0.3 inches and discontinuous in a middle of the range, as further discussed herein. In a practical implementation strategy, a bell gear 60 is positioned upon crankshaft 16, and may be clamped between engine-side disc 48 and crankshaft 16 via bolts 70 in a conventional manner. A geartrain 62 may be coupled to and driven by rotation of bell gear 60 in certain embodiments. A gear ring 58 is also coupled to engine-side disc 48 in a practical implementation strategy, and may be used for conventional purposes such as engine starting and crank angle monitoring.

Figure 2:
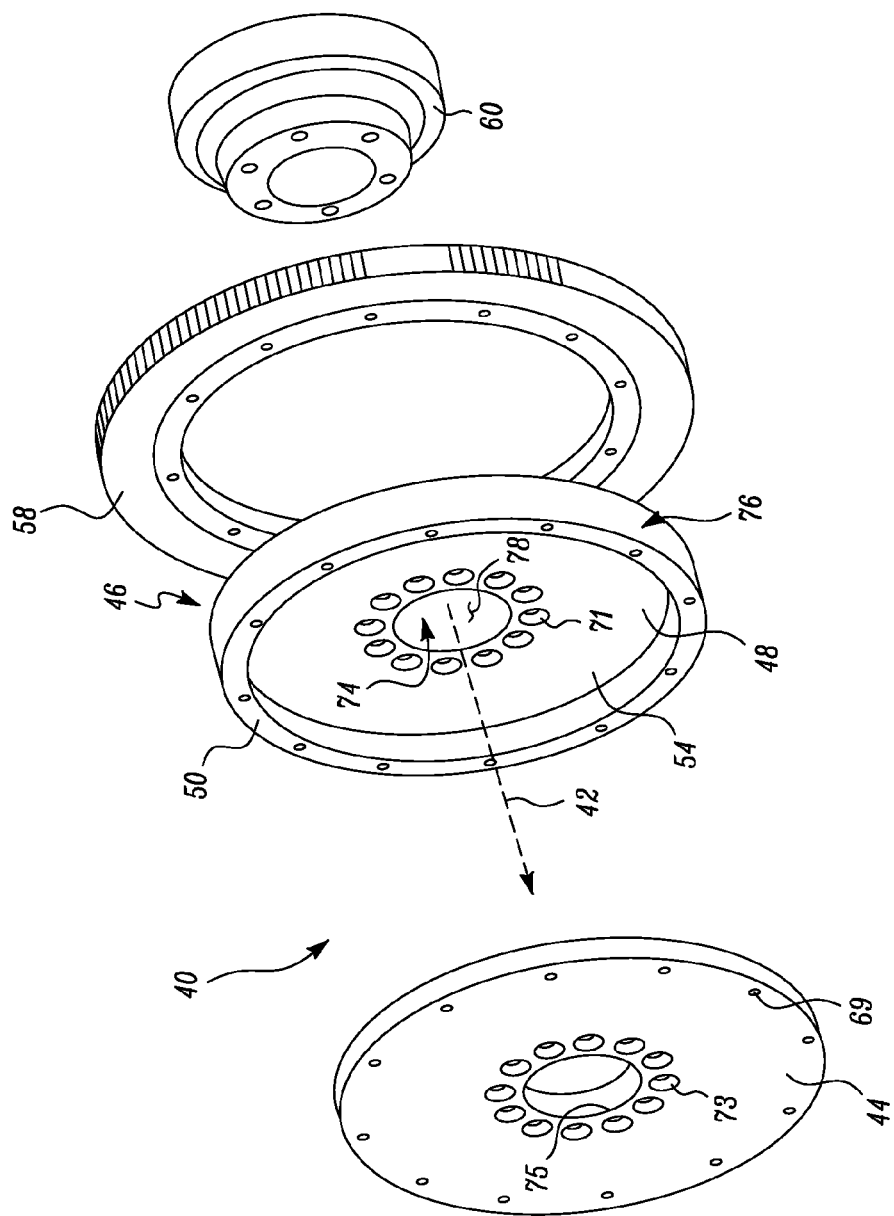
FIG. 2 is an exploded view of components in a driveline of an engine system, including a torsional coupling according to one embodiment.
Figure 3:
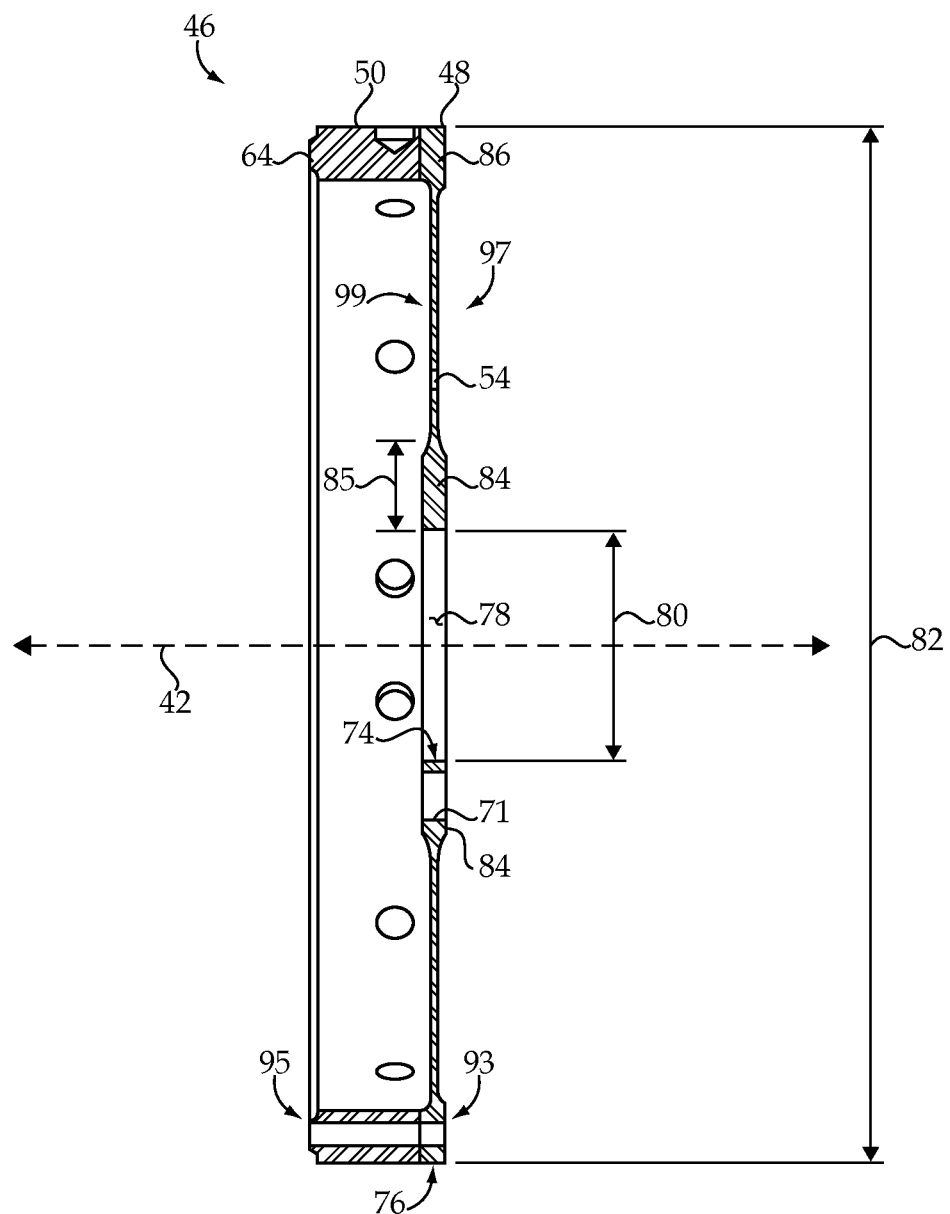
FIG. 3 is a sectioned side diagrammatic view of a flywheel for a torsional coupling, according to one embodiment.

Referring also to FIG. 2, there is shown torsional coupling 40 disassembled and decoupled from gear ring 58 and bell gear 60. As shown in FIG. 2, disc 48 may include an inner perimeter 74, and an outer perimeter 76. Disc web 54 extends circumferentially around center axis 42. A plurality of bolt holes 71 are arranged in a generally circular pattern about axis 42, adjacent inner perimeter 74 and are configured to receive bolts 70, as can be seen in FIG. 1, in a conventional manner. Inner perimeter 74 defines a circular opening 78 which is configured to receive an end of crankshaft 16, as can be seen in FIG. 1. FIG. 2 also illustrates driven-side disc 44, and a plurality of bolt holes 73 configured to receive bolts 72 to couple disc 44 to driveshaft 30, as can be seen in FIG. 1. A circular opening 75 is also formed in disc 44, and a plurality of bolt holes 69 are formed in disc 44 for receipt of a plurality of bolts 68 to reversibly attach disc 44 to annular flange 50 and thereby form a bolted joint 90, as can be seen in FIG. 1. Disc 48 may be coupled to annular flange 50 in flywheel 46 via welding at a welded joint 88, such that annular flange 50 and disc 48 are irreversibly attached to one another, as can be seen in FIG. 1. In a practical implementation strategy, annular flange 50 may include a tab 64 extending circumferentially around axis 42, as can be seen in FIG. 3. Driven-side disc 44 may define a groove 66 receiving tab 64, as can be seen in FIG. 1. The configuration of tab and groove could also be reversed.

Referring also now to FIG. 3, there is shown a sectioned side diagrammatic view of flywheel 46. Engine-side disc 48 may include a first axial side 93 which faces engine 14, and a second axial side 95 which faces driven unit 26 in a typical design. An inboard region 84 has bolt holes 71 formed therein, and an outboard region 86 is attached to flange 50. Regions 84 and 86 are typically uniform in radial extent circumferentially about axis 42. Disc web 54 extends radially between inboard region 84 and outboard region 86, and extends circumferentially around axis 42. Disc web 54 will thus be understood to have a generally annular configuration, and forms a first annular hollow 97 on first axial side 93, and a second annular hollow 99 on second axial side 95. Inner perimeter 74 defines circular opening 78 as mentioned above and can be considered a part of inboard region 84, whereas outer perimeter 76 may be understood as a part of outboard region 86. In a practical implementation strategy, a diameter 80 of circular opening 78 may be about 8 inches. A disc diameter 82 at outer perimeter 76 may be about 36 inches. A radial extent 85 of inboard region 84 may be about 3 inches, more particularly about 3.23 inches. Outboard region 86 may have a similar or slightly smaller radial extent. It can be noted from FIG. 3 that a majority of a radial extent from inner perimeter 74 to outer perimeter 76 is formed by disc web 54. A radial extent of disc web 54 may be from about two times to about three times the radial extents of each of inboard region 84 and outboard region 86.

It can also be seen from FIG. 3 that inboard region 84 and outboard region 86 may each have a greater axial thickness, whereas disc web 54 has a lesser axial thickness. Axial thickness of regions 84 and 86 may be about 0.75 inches. The varying of the axial thickness between inner perimeter 74 and outer perimeter 76 imparts desirable flexing properties to disc 48 in service, as further discussed herein. For certain applications, axial thickness 56 may be less than 0.25 inches, and in other applications axial thickness 56 may be greater than 0.25 inches. A thinner disc web has been determined to be associated with greater reliability in terms of fatigue failure insensitivity, whereas a thicker disc web is associated with greater load supporting capacity. In the case of a disc web thinner than 0.25 inches, an axial thickness of about 0.22 inches, and more particularly about 0.219 inches has been determined to be optimal. For a disc web thicker than 0.25 inches, for instance in a torsional coupling where a total of one bearing supports an assembly of a rotor and driveshaft in a generator, an axial thickness of about 0.31 inches provides a practical implementation strategy, and more particularly an axial thickness of about 0.313 inches.

It will be recalled that disc web 54 includes an axial thickness 56 in a range from about 0.2 inches to about 0.3 inches and which is discontinuous in the middle of the range. As used herein, the term "about" should be understood in the context of conventional rounding to a consistent number of significant digits. Accordingly, "about 0.2 inches" means from 0.15 inches to 0.24 inches, "about 0.31 inches" means from 0.305 inches to 0.314 inches, and so on. The axial thickness range may be understood to be discontinuous in that the permissible axial thickness range is not a continuum from about 0.2 inches to about 0.3 inches but is instead interrupted in the middle of what would otherwise be a continuum. A discontinuity, in other words a gap in the range of permissible axial thickness, will encompass a thickness of 0.25 inches, halfway between the nominal range minimum 0.2 and nominal range maximum 0.3.

INDUSTRIAL APPLICABILITY

Figure 4:
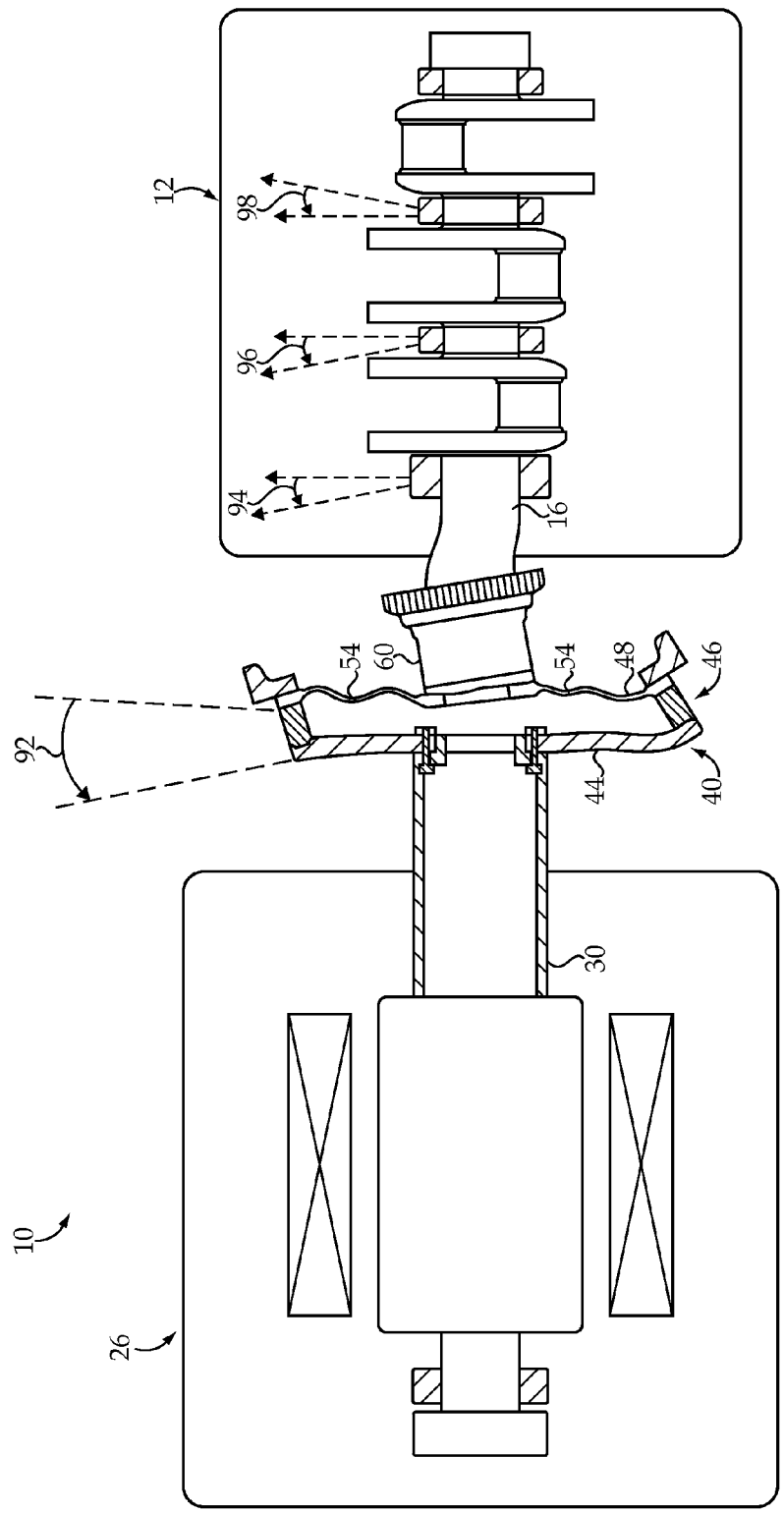
FIG. 4 is a partially sectioned side diagrammatic view of the engine system of FIG. 1 shown in a state of driveline deflection.

Referring to the drawings generally, but in particular now to FIG. 4, there is shown engine system 10 as it might appear where a load deflecting torsional coupling 40 during transfer of torque between crankshaft 16 and driveshaft 30 is being applied by bell gear 60 and crankshaft 16 to disc 48. The FIG. 4 illustration is intended as diagrammatic only, and is exaggerated from what the various components might experience during deflection. It can be noted, however, that deformation of crankshaft 16 has induced torsional coupling 40 to deform, tilting slightly and flexing each of disc 44 and disc 48. Deflection of torsional coupling 40 in this general manner may be caused by vibrations such as second order vibrations of crankshaft 16, vibrations of driveshaft 30, or a combination of both.

In certain known engine system designs it was observed that so-called driveline deflection of a torsional coupling with a thick engine-side disc and a thin driven-side disc could cause premature fatigue failure of the thick engine-side disc, and in some instances could cause performance degradation or other problems in bearings supporting the crankshaft. In FIG. 4, an angle 92 is shown between a plane passing through an axis of rotation, ideally nominally shared by crankshaft 16 and driveshaft 30, and a second plane defined by disc 44. In the known design mentioned above, an angle of deflection analogous to angle 92 was observed to be about 0.29°. According to the present disclosure, angle 92 may be substantially smaller, and equal to about 0.115° for an engine-side disc web of about 0.31 inches axial thickness, and about 0.114 degrees for an engine-side disc web of about 0.22 inches axial thickness.

It can therefore be readily understood that angular deflection in a torsional coupling according to the present disclosure may be substantially different, and less than, angular deflection in a known design. The concepts set forth herein may be understood to effectively move a driveline flexural point relatively closer to the rear main bearing 18 in engine 14 than what would be the case in a known design with a thicker engine-side disc and a thinner driven-side disc. It can also be noted from FIG. 4 that disc 54 flexes predominantly over disc 44. Another way to understand the phenomena depicted in FIG. 4 is that in torsional coupling 40 disc 48 bends more than disc 44. An overall deflection of torsional coupling 40 is limited by enabling elastic deformation within the torsional coupling itself. As noted above, the dynamics leading to deflection of torsional coupling 40 may be relatively complex, and certainly more than one pattern of vibrations in engine system 10 might lead to deflection. Moreover, it should be appreciated that such deflection might occur only occasionally or intermittently or only under certain specific operating conditions such as speed or load of engine system 10. Torsional coupling 40 is nevertheless contemplated to be capable of managing such deflection without premature fatigue failure, reflecting the surprising discovery that relatively more flexing of a thin engine-side disc provides for better fatigue failure resistance than less flexing in a thicker engine-side disc.

As also noted above, in addition to subjecting a torsional coupling to potentially damaging fatigue conditions, certain known designs also could subject bearings in an engine system to unduly burdensome conditions. In FIG. 4, a number of additional angles 94, 96, and 98 are shown, representing deflections of crankshaft 16 from a nominal linear state. Angle 94 may be about 0.098°, angle 96 may be about 0.0049°, and angle 98 may be about −0.0098°. In a known design, angles of deflection analogous to angles 94, 96 and 98 under analogous conditions would likely be about 0.114°, −0.0015°, and −0.0115°. Given the reduction in deflection of the crankshaft itself within the engine housing, it can be seen that operating conditions on at least some of the crankshaft bearings, and notably the rear main bearing, may be less harsh according to the present disclosure.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An engine system comprising:
an internal combustion engine including an engine housing and a crankshaft rotatable within the engine housing;
a driven unit including a driven unit housing and a driveshaft rotatable within the driven unit housing;
a torsional coupling rotatable about a center axis to transfer torque between the internal combustion engine and the driven unit, the torsional coupling comprising:
a driven-side disc coupled to the driveshaft; and
a flywheel comprising:
an engine-side disc coupled to the crankshaft, a center of the engine-side disc aligning with the center axis; and
an axially projecting annular flange coupling the engine-side disc to the driven-side disc, the axially projecting annular flange configured to couple the engine-side disc to the driven-side disc coupled to the driveshaft in the driven unit to transfer torque via the torsional coupling between the crankshaft and the driveshaft, wherein the annular flange is irreversibly coupled to the engine-side disc, and reversibly coupled to the driven-side disc,
wherein the engine-side disc comprises:
an inboard region having a first axial thickness and a first radial extent, the inboard region defines a circular opening configured to receive the crankshaft;
an outboard region having a second axial thickness and a second radial extent;
a disc web extending radially between the inboard and outboard regions and oriented about the center axis, the disc web having a third axial thickness and a third radial extent,
wherein the first radial thickness and the second axial thickness are each greater than the third axial thickness; and
wherein the third radial extent is greater than a sum of the first radial extent and the second radial extent.

2. The engine system of claim 1, wherein the driver unit further comprises a rotor mounted to the driveshaft, and wherein the rotor and the driveshaft form an assembly rotatable within the driven housing.

3. The engine system of claim 2, wherein the driven unit further comprises a bearing supporting the assembly of the rotor and driveshaft for rotation within the driven unit housing.

4. The engine system of claim 3, wherein the third axial thickness is about 0.31 inches.

5. The engine system of claim 2, wherein the driven unit further comprises an electrical generator and the rotor comprises a permanent magnet rotor of the electrical generator.

6. The engine system of claim 1, wherein the annular flange includes a tab extending circumferentially around the center axis, and the driven-side disc defines a groove receiving the tab, and the torsional coupling further includes a plurality of bolts reversibly coupling the annular flange to the driven-side disc.

7. The engine system of claim 1, further comprising:
   a bell gear clamped between the engine-side disc and the crankshaft; and
   a gear ring coupled to the engine-side disc.

8. A flywheel, for a torsional coupling in an engine system having an internal combustion engine and a driven unit, the flywheel comprising:
   an engine-side disc configured to couple to a crankshaft in the internal combustion engine, a center of the engine-side disc defining a center axis; and
   an axially projecting annular flange attached to the engine-side disc, the axially projecting annular flange configured to couple the engine-side disc to a driven-side disc coupled to a driveshaft in the driven unit to transfer torque via the torsional coupling between the crankshaft and the driveshaft,
   wherein the engine-side disc comprises:
      an inboard region having a first axial thickness and a first radial extent;
      an outboard region having a second axial thickness and a second radial extent, and being attached to the axially projecting annular flange; and
      a disc web extending radially between the inboard and outboard regions and oriented about the center axis, the disc web having a third axial thickness and a third radial extent, the third radial extent is greater than a sum of the first radial extent and the second radial extent;
   wherein the first axial thickness and the second axial thickness are greater than the third axial thickness; and
   wherein the third axial thickness, is less than 0.25 inches, the third radial extent of the disc web is between 2 times to 3 times a sum of the first radial extent and the second radial extent, and a diameter of the engine-side disc is about 36 inches.

9. The flywheel of claim 8, wherein the engine-side disc has a first axial side and a second axial side, and wherein the engine-side disc defines a first annular hollow on the first axial side and a second annular hollow on the second axial.

* * * * *